United States Patent
Tang et al.

(10) Patent No.: US 6,718,303 B2
(45) Date of Patent: *Apr. 6, 2004

(54) APPARATUS AND METHOD FOR AUTOMATICALLY GENERATING PUNCTUATION MARKS IN CONTINUOUS SPEECH RECOGNITION

(75) Inventors: Donald T. Tang, Beijing (CN); Xiao Jin Zhu, Jiangsu (CN); Li Oin Shen, Beijing (CN)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 195 days.

(21) Appl. No.: 09/311,503

(22) Filed: May 13, 1999

(65) Prior Publication Data

US 2002/0069055 A1 Jun. 6, 2002

(30) Foreign Application Priority Data

May 13, 1998 (CN) .......................... 98108367

(51) Int. Cl.$^7$ .............................. G10L 15/00
(52) U.S. Cl. ...................... 704/235; 704/246; 704/251; 704/215
(58) Field of Search ................. 704/235, 251, 704/256, 246, 215, 233, 257

(56) References Cited

U.S. PATENT DOCUMENTS 5,799,276 A * 8/1998 Komissarchik et al. ..... 704/251
6,067,514 A * 5/2000 Chen .......................... 704/235

FOREIGN PATENT DOCUMENTS

| JP | 114041 | 9/1981 | |
| JP | 56-114041 | * 9/1981 | ........... G10L/15/00 |
| JP | 285570 | * 12/1986 | ........... G10L/15/00 |
| JP | 224796 | 9/1989 | |
| JP | 047688 | 2/2000 | |

OTHER PUBLICATIONS

Nishimura et al., "Word–based Approach to Large–vocabulary Continuous Speech Recognition for Japanese," Information Processing Society of Japan Paper Magazine v. 40 n. 4 pp. 1395–1403 (Apr. 15, 1999).

Nishimura et al., "Word–based Approach to Large–vocabulary Continuous Speech Recognition for Japanese," Information Processing Society of Japan Research Report, vol. 98, No. 12, pp. 17–24 (May 2, 1998).

* cited by examiner

Primary Examiner—Richemond Dorvil
Assistant Examiner—Daniel Abebe
(74) Attorney, Agent, or Firm—Thu A Dang

(57) ABSTRACT

An apparatus for automatically generating punctuation marks in a continuous speech recognition system, comprises means (1,2,3,5) for recognizing user speech and converting the user speech into words, characterized in that means (1,2,3,5) for recognizing user speech is further used to recognize pseudo noises in the user speech; and the apparatus characterized by further comprising: means (9) for marking pseudo noises in output results of means (1,2,3,5) for recognizing user speech; means (10,14,13) for generating punctuation marks by finding most likely pseudo punctuation marks at locations of pseudo noises marked by the means (9) for marking pseudo noises based on a language model containing pseudo punctuation marks.

4 Claims, 4 Drawing Sheets

APPARATUS AND METHOD FOR AUTOMATICALLY GENERATING PUNCTUATION MARKS IN CONTINUOUS SPEECH RECOGNITION

BACKGROUND OF THE INVENTION

1. Field of the Invention

This invention relates to the continuous speech recognition technology, and more particularly to the apparatus and method for automatically generating punctuation marks in continuous speech recognition.

2. Related Art

A general speech recognition system can be shown as in FIG. 1. The system generally contains an acoustic model 7 and a language model 8. The acoustic model 7 includes the pronunciations of commonly used words in the recognized language. Such a word pronunciation is summarized by using a statistical method from the pronunciations when most people read this word and represents the general pronunciation characteristic of the word. The language model 8 includes the methods by which the commonly used words in the recognized language are utilized.

The operation procedure of the continuous speech recognition system shown in FIG. 1 is as follows: voice detection means 1 collects user's speech, for example, expresses the language in speech samples, and sends the speech samples to the pronunciation probability calculation means 2. For every pronunciation in the acoustic model 7, pronunciation probability calculation means 2 gives the probability estimation value of whether it is the same as the speech sample. The word probability calculation means 5, according to the language rules summarized from a large amount of language materials, gives the probability estimation value for the word in the language model 8 of whether it is the word that should occur in the current context. The word matching means 3 calculates a joint probability (representing the ability of recognizing the speech sample as this word) through combining the probability value calculated by pronunciation probability calculation means 2 with the probability value calculated by the word probability calculation means 5, and takes the word with the greatest joint probability value as the result of the speech recognition. The context generating means 4 modifies the current context by using the above described recognition result, to be used in the recognition of the next speech sample. The word output means 6 outputs the recognized word.

The above continuous recognition procedure can be performed in units of a character, a word, or a phrase. Therefore, thereafter a word will refer to a character, a word, or a phrase.

To mark the recognized result with punctuation, current continuous speech recognition system requires punctuation marks being spoken during dictation, and then recognizes them. For example, to recognize "Hello! World." completely, the speaker must say, "Hello exclamation point world period". That is, in current speech recognition system it is required that punctuation marks have to be converted into speech by the speaker (i.e. the punctuation marks have to be spoken out), and then recognized as corresponding punctuation marks by speech recognition system. So it is required that the language model includes punctuation marks, i.e. language model 8 is able to give the estimation probability value for every punctuation mark of whether it is the punctuation mark that should occur in current context.

However, it cannot be expected that people say punctuation marks when transcribing a natural speech activity (e.g. in conference, radio broadcast and TV program etc.) by using the above mentioned speech recognition system. Furthermore, it is highly unnatural to speak out punctuation marks during dictation. Even when being asked to do so, people often forget to speak out punctuation marks during speaking or reading articles. Moreover, in spontaneous speech dictation while every sentence comes directly from mind, it is very difficult for most people to correctly decide punctuation marks that should be used and to speak out every punctuation mark correctly without the loss of fluency. This may be the result of the fact that punctuation marks are seldom, if not never, used in daily spoken language.

Therefore, in continuous speech recognition there is an urgent need for an apparatus and method for automatically generating punctuation marks, which should be easily used and does not require punctuation marks being spoken out in speech, and hence should not affect user's normal speech.

SUMMARY OF THE INVENTION

The first object of this invention is to provided an apparatus for automatically generating punctuation marks in continuous speech recognition.

The second object of this invention is to provided a method for automatically generating punctuation marks in continuous speech recognition.

To achieve the first object, the invention provides an apparatus for automatically generating punctuation marks in continuous speech recognition, comprising a speech recognition means for recognizing user's speech as words. This speech recognition means also recognizes pseudo noises in user's speech; and further comprising: pseudo noise marking means for marking pseudo noises in output results of the speech recognition means; a punctuation mark generating means for generating punctuation marks corresponding to the most likely pseudo punctuation marks by finding most likely pseudo punctuation marks at every location of pseudo noises marked by the pseudo noise marking means based on a language model containing pseudo punctuation marks.

The invention further provides an apparatus for automatically generating punctuation marks in continuous speech recognition, comprising a speech recognition means for recognizing user's speech as words; punctuation mark location indicating means for generating a location indicating signal in response to the user's operation during user's dictation, said location indicating signal indicating a location in the output result of the speech recognition means; pseudo punctuation mark probability calculating means for giving the probability estimation value for every pseudo punctuation mark contained in the language model containing pseudo punctuation marks that it will occur in the output result of the speech recognition means; punctuation mark matching means for generating a punctuation mark corresponding to the pseudo punctuation mark by finding the pseudo punctuation mark at the location indicated by the location indicating signal based on the probability estimation value calculated by the pseudo punctuation mark probability calculating means.

To achieve the second object, the invention provides a method for automatically generating punctuation marks in continuous speech recognition, comprising a speech recognition step for recognizing user's speech as words, said speech recognition step also recognizing pseudo noises in the user speech; and further comprising the following steps: pseudo noise marking step for marking pseudo noises in output results of the speech recognition step; a punctuation mark generating step for generating punctuation marks corresponding to the most likely pseudo punctuation marks by finding most likely pseudo punctuation marks at every location of pseudo noises marked in the pseudo noise marking step based on a language model containing pseudo punctuation marks.

The invention further provides a method for automatically generating punctuation marks in continuous speech recognition, comprising a speech recognition step for recognizing user's speech as words; punctuation mark location indicating step for generating it location indicating signal in response to the user's operation during user's dictation, said location indicating signal indicating a location in the output result of the speech recognition step; pseudo punctuation mark probability calculating step for giving the probability estimation value for every pseudo punctuation mark contained in the language model containing pseudo punctuation mark that it will occur in the output result of the speech recognition step; punctuation mark matching step for generating a punctuation mark corresponding to the pseudo punctuation mark by finding the pseudo punctuation mark at the location indicated by the location indicating signal based on the probability estimation value calculated by the pseudo punctuation mark probability calculating step.

According to the apparatus and method of the invention, it is not necessary for a user to speak out punctuation marks for the system can automatically generate punctuation marks. Therefore, with the apparatus and method of the invention, the fluency of user's speech will not be affected and the correctness and fastness in speech recognition system can be enhanced.

BRIEF DESCRIPTION OF THE DRAWINGS

The other objects and features will become more obvious after the embodiments of the invention are described in detail in conjunction with the attached drawings.

DETAILED DESCRIPTION OF THE INVENTION

First, several concepts of the invention will be introduced.

In daily speech, in addition to issuing continuous speech corresponding to the language words, people often utter some noises, such as inhaling and lip smacking sounds etc. These noises cannot be recognized as language words. Moreover, there may be silence between continuous sounds. General speech recognition systems do not use these noises and silence, and simply remove them. Through experiments the inventors found that there is a certain relation between the noises and silence and the punctuation marks that should be marked. For example, when reading articles, if period "." occurs, people customarily keep in silence for a longer time; and if comma "," occurs, they often keep silence for a shorter time, and inhale quickly; while "," occurs, only keep in silence for a even shorter time without inhaling. Therefore, in the method of the invention, these noises and silence will be utilized.

In addition, when two words are spoken smoothly with no sound and no pause in between, there may be a punctuation mark between them. In order to implement the method of the invention, a symbol "no sound" is artificially added between two successive words. In this specification, noise, silence and "no sound" will be referred to as pseudo noises. Therefore, there is always a pseudo noise between any two word sounds.

All pseudo noises will construct pseudo noise set D. Therefore,

D={"no sound", silence, inhaling, lip smacking, . . . }

There are certain rules of marking punctuation marks in a language. In order to facilitate implementation of automatic marking of punctuation marks in computers, it is necessary to summarize the rules of marking punctuation marks by statistic method from vast amount of speech materials containing punctuation marks. To facilitate implementation of the method of the invention, a so-called "no punctuation" mark is purposely added into the text where the punctuation marks should not occur. In this specification punctuation marks and "no punctuation" mark are defined as pseudo punctuation marks.

Hence there is always a pseudo punctuation mark between any two words.

All the pseudo punctuation marks constitute a pseudo punctuation mark set M.

M={"no punctuation", "period", "comma", "exclamation mark", "short pause", . . . }

The automatic generation of punctuation marks comprises two necessary steps. In the first step, it is determined where the punctuation marks should be marked, i.e. the locations of punctuation marks are determined. In the second step, it is determined which punctuation marks should be marked, i.e. the types of punctuation marks are determined. Hereafter, the first more complex embodiment, which can automatically complete the determinations of the locations and types of punctuation marks, will be described. Then the second embodiment, in which there is a need for users to indicate the locations of punctuation marks, will be described.

Figure 1:
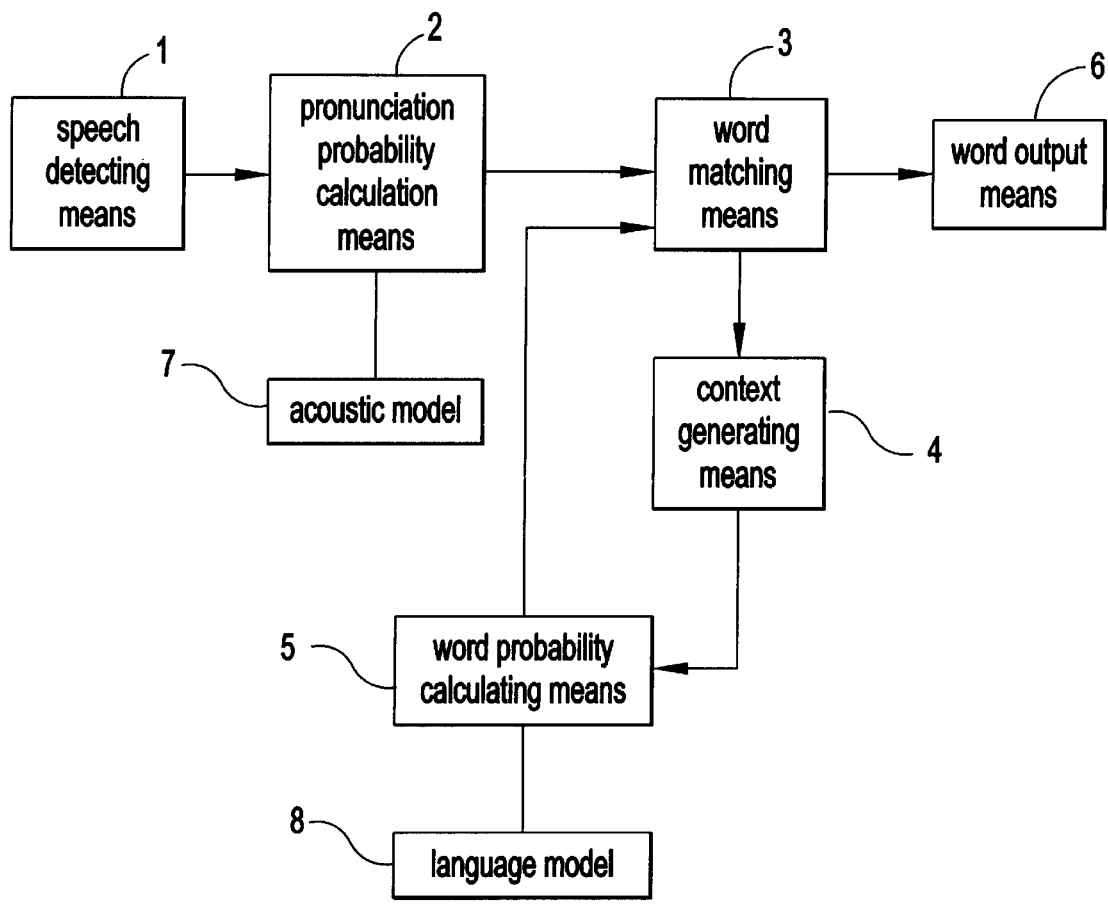
FIG. 1 is a schematic diagram of the construction of a continuous speech recognition system in the prior art.
Figure 2:
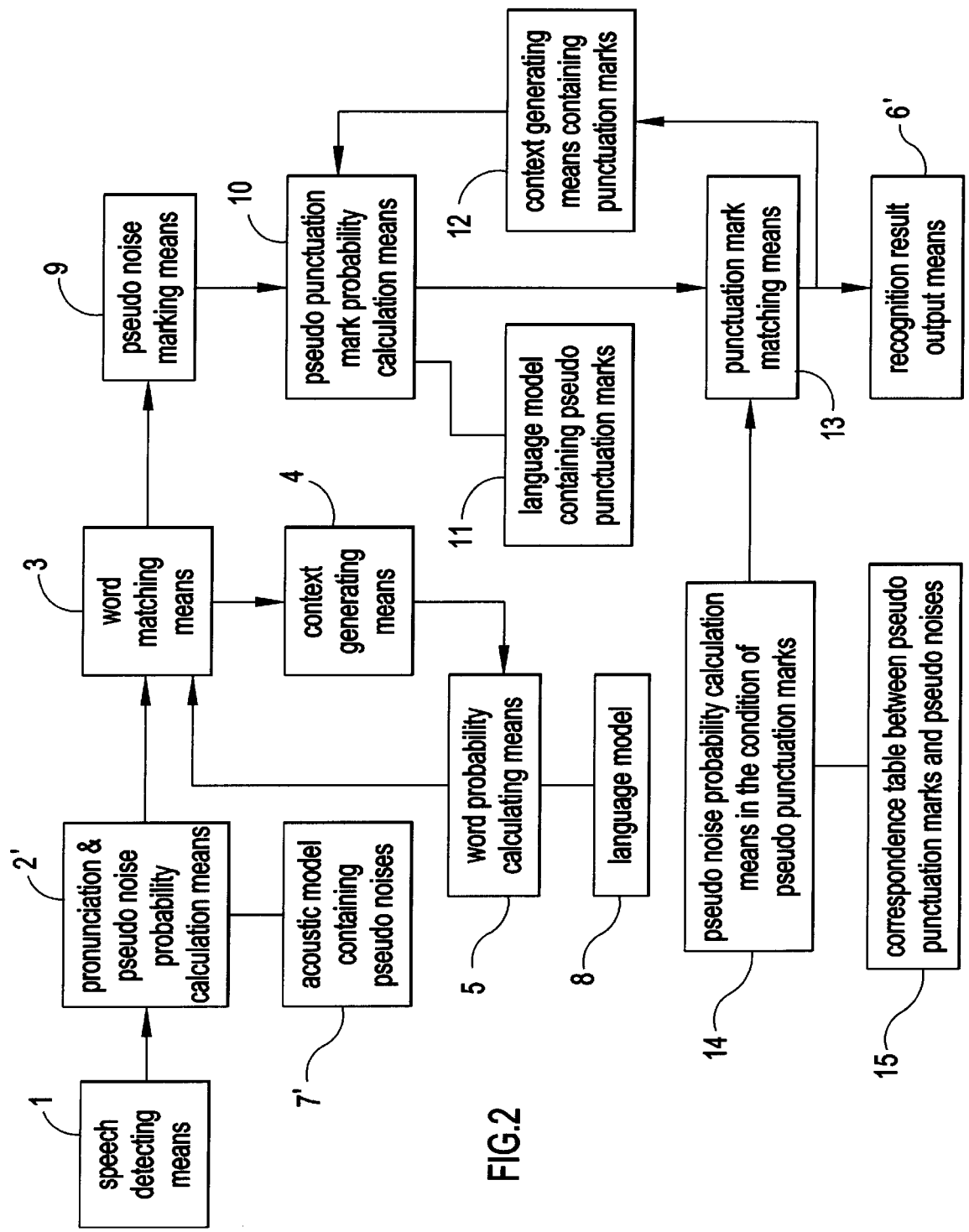
FIG. 2 is a schematic diagram of the general construction of the first embodiment of the apparatus for automatically generating punctuation mark in continuous speech recognition according to this invention.

FIG. 2 shows a schematic diagram of a general structure of the first embodiment of the apparatus for automatically generating punctuation marks in continuous speech recognition according to this invention. In FIG. 2, reference number 1 denotes speech detection means, reference number 2' the pronunciation and pseudo noise probability calculating means, reference number 3 the word matching means, reference number 4 the context generating means, reference number 5 the word probability calculating means, reference number 6' the recognized result output means, reference number 7' the acoustic model containing pseudo noises, reference number 8 the language model. The above components have functions identical or similar to the corresponding ones shown in FIG. 1. In addition, reference number 9 denotes pseudo noise marking means, reference number 10 the pseudo punctuation mark probability calculating means, reference number 11 the language model containing pseudo punctuation marks, reference number 12 the context generating means containing punctuation marks, reference number 13 the punctuation mark matching means, reference number 14 the pseudo noise probability calculating means in the condition of pseudo punctuation marks, reference number 15 the comparison table between pseudo punctuation marks and pseudo noises.

In FIG. 2, the acoustic corresponding to each element of the pseudo noise set D is added into the acoustic model 7' containing pseudo noises (its function is similar to the acoustic model 7 of FIG. 1). Therefore, an element in the acoustic model 7' containing pseudo noises corresponds either to the pronunciation of a word or to a pseudo noise. For each pronunciation or noise in the acoustic model 7' containing pseudo noises, the pronunciation and pseudo noise probability calculating means 2' gives the probability estimation value of whether it is close to the speech sample. The acoustic model containing pseudo noises is called the first acoustic model AM1, which contains not only the pronunciation of each word, but also the acoustic corresponding to each pseudo noise.

Each element in the pseudo punctuation mark set M is added into the language model 11 containing pseudo punctuation marks. Of course, all pseudo punctuation marks can be added into language model 8 as the same model. Different implementation ways do not make limitations on the invention. Word probability calculating means 5 is the same as the word probability calculating means 5 in FIG. 1, and the language model used therein is called the first language model LM1. The first language model LM1 contains every frequently used word in the recognized language.

Therefore, similar to the apparatus shown in FIG. 1, the detected acoustic can be decoded into corresponding word or pseudo noise by using acoustic detection means 1, pronunciation and pseudo noise probability calculating means (AM1) 2', word matching means 3, context generating means 4 word probability calculating means (LM1) 5, acoustic model 7' containing pseudo noises and language model 8. This decoded result will be called the first sequence. Other pseudo noises, such as "no sound", in the first sequence will be marked by using pseudo noise marking means 9.

In the case of current context (containing a pseudo punctuation mark), pseudo punctuation mark probability calculating means 10 calculates the probability estimation value of whether the pseudo punctuation mark in language model 11 containing pseudo punctuation marks is the next punctuation mark, based on the language rules summarized from a large amount of language materials containing punctuation marks. The language model 11 used by this apparatus will be called the second language model LM2. In constructing the second language model, all punctuation marks in the speech materials have been reserved. Hence, the second language model LM2 contains every pseudo punctuation mark. For example, assuming c as the current context and m as the pseudo punctuation mark, the action of LM2 is to calculate P(m|c).

Pseudo noise probability calculating means in the condition of pseudo punctuation marks 14, using the second language model AM2, gives the probability estimation value of that a specific pseudo noise occurs at certain pseudo punctuation mark. The second language model AM2 is constructed based on a large amount of language materials by using statistic method. During the construction of the second language model AM2, corresponding pairs of pseudo punctuation marks and pseudo noises are found and stored into the comparison table 15 between pseudo punctuation marks and pseudo noises. Pseudo noise probability calculating means in the condition of pseudo punctuation marks 14, based on comparison table 15 between pseudo punctuation marks and pseudo noises, calculates conditional probability P(d|m), wherein m is the pseudo punctuation mark and d is the pseudo noise. The particular construction of the second language model AM2 will be described in detail latter.

Naturally, such conditional probability P(d|m) can be obtained in advance by statistic method using a large amount of language materials and stored in a correspondence table. In practical procedure of generating punctuation marks, corresponding probability values are found by retrieving the table. That is, the pseudo noise probability calculating means in the condition of pseudo punctuation marks can be implemented in different ways, but different ways do not make any limitation for this invention.

Punctuation marks matching means 13 combines the probability estimation value P(m|c) calculated by pseudo punctuation marks calculating means 10 with the probability estimation value P(d|m) calculated by pseudo noise probability calculating means 14 in the condition of pseudo punctuation marks, calculates a correlation probability P(d|m)* P(m|c) (representing the possibility of recognizing the pseudo noise as another pseudo punctuation mark) in respect to every pseudo punctuation mark in the language model 11 containing pseudo punctuation marks, and takes the pseudo punctuation mark with the maximum correlation probability value as the automatically generated pseudo punctuation mark. This procedure can be expressed as:

$$M^{ML} = \mathrm{argmax}\ m: AM2(d,m)*LM2(m,c)$$

wherein m is the pseudo punctuation mark; d is the noise; c is the context; and $$AM2(d,m)=P(d|m),$$

$$LM2(m,c)=P(m|c).$$

When m="no punctuation", it represents that a word, instead of a punctuation mark, should occur in the context condition, and therefore $$P(\text{"no punctuation"}|c)=\Sigma P(w|c).$$

$$w=\text{word}$$

The context generating means 12 containing punctuation marks modifies the current context using the above mentioned generated punctuation mark to process the next pseudo noise. The recognition result output means 6' outputs the recognized word and the automatically generated pseudo punctuation mark (or the converted usual punctuation mark).

As the second embodiment of the apparatus for automatically generating punctuation marks according to this invention, another type of apparatus for automatically generating punctuation marks in continuous speech recognition derives from the first embodiment as described above. The significant difference lies in that it includes a punctuation mark location indicating means for making a response to the user's operation during dictation to generate a location indicating signal which indicates a location in the output result of the acoustic recognition means. The location indicating means may be, for example, a mouse or other special hardware; It also includes a pseudo punctuation probability calculating means (10) for giving the probability estimation value for each pseudo punctuation mark contained in the language model containing pseudo punctuation marks that it will occur in the output results of the acoustic recognition means; and punctuation mark matching means for finding the pseudo punctuation mark at the location indicated by the location indicating signal according to the probability estimation value calculated by the pseudo punctuation mark probability calculating means, and generating the punctuation mark corresponding to the pseudo punctuation mark.

With the above apparatus for automatically generating punctuation marks, no pseudo noise is utilized. Thus the pseudo noise section in the first language model AM1 and the second language model AM2 are omitted and the implementation is easier. Meanwhile, higher accuracy can be obtained. But it is not so convenient for the users to use as in the first embodiment.

Figure 3:
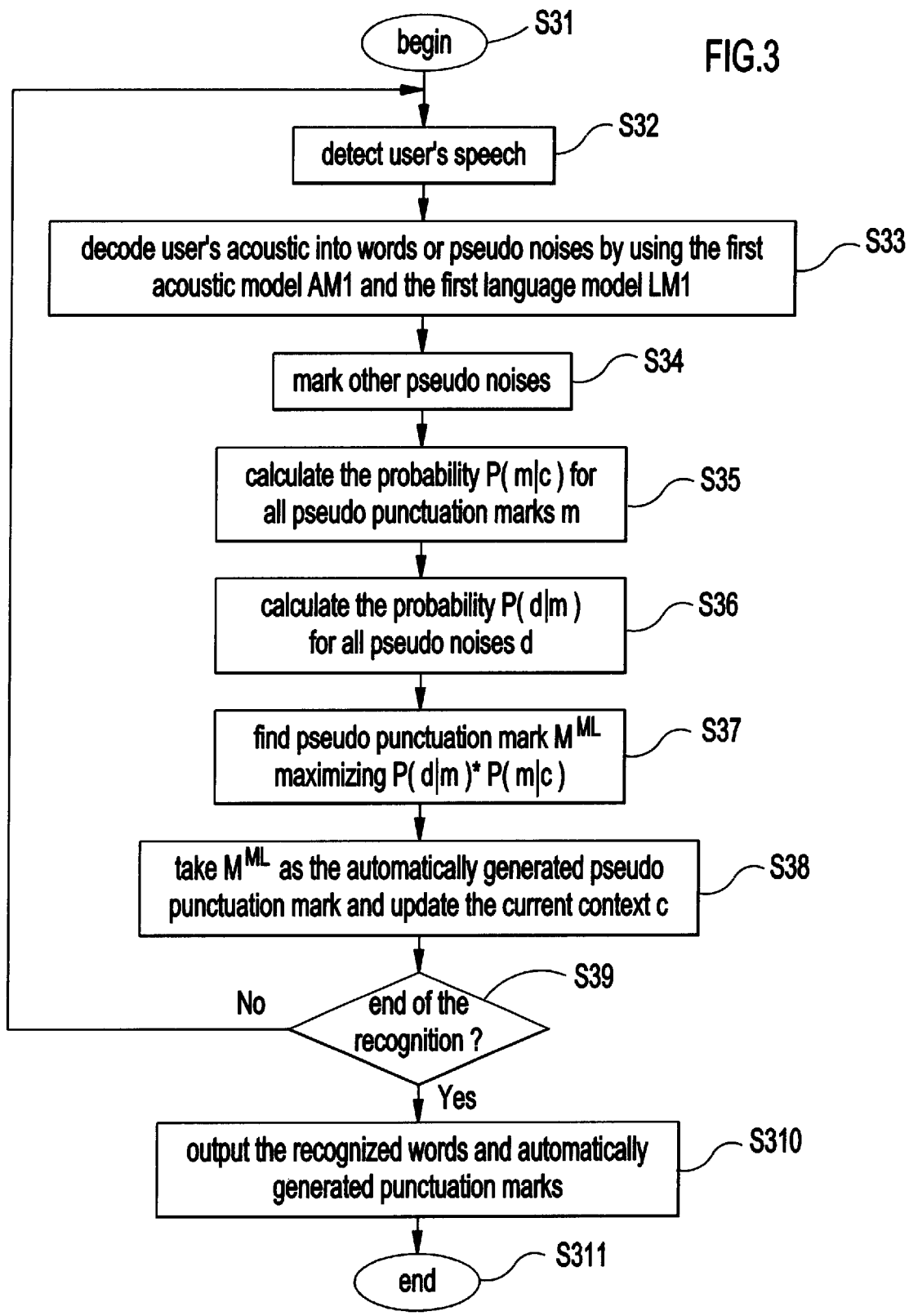
FIG. 3 is a general flowchart of the first embodiment of the method for automatically generating punctuation mark in continuous speech recognition according to this invention.

FIG. 3 is a flowchart of the first embodiment of the method for automatically generating punctuation marks in continuous speech recognition according to this invention.

In step S31, the acoustic recognition procedure is started. In this step, all internal variables such as context c are emptied.

In step S32, the acoustic with which the user reads a word is detected. In step S33, the user's acoustic is decoded into words or pseudo noises by using the first acoustic model AM1 and the first language model LM1. For example, when reading the following Chinese sentence "This apple is red, not green."

people read only the words wherein. Therefore, by repeatedly carrying out each of following steps, the user's speech can be decoded into the following first sequence:

"This apple is red(inhaling)not green(silence)".

In step S34, the pseudo noise in the above first sequence is marked. The pseudo noise herein refers to the other pseudo noises which have not been decoded in step S33. In this embodiment, a mark "no sound" is added between two successive words to facilitate the implementation. Therefore, the following second sequence is formed:

"This (no sound) apple (no sound) is (no sound) red (inhaling) not (no sound) green (silence)".

In step S35, for all pseudo punctuation marks m, the conditional probability P(m|c) in the case of the current context is calculated.

In step S36, for all pseudo noises d, the conditional probability P(d|m) in the case of respective pseudo punctuation marks m is calculated. Alternatively, for each pseudo noise d and each pseudo punctuation mark m, the conditional probability P(d|m) is calculated in advance on the basis of a large amount of language materials by using statistic method, and stored in a table, then step S36 is implemented by retrieving the table.

In step S37, it is to find out pseudo punctuation mark $M^{ML}$ maximizing P(d|m)* P(m|c), i.e. to calculate $$M^{ML} = \text{argmax } m:P(d|m)*P(m|c).$$

Steps S35, S36 and S37 can also be regarded as the following procedure.

For every pseudo noise d and its context c in said second sequence, the optimum pseudo punctuation $M^{ML}$ is found by using the second acoustic model (AM2) and the second language model (LM2) such that $$M^{ML} = \text{argmax } m: AM2(d,m)*LM2(m,c)$$

wherein m is a punctuation mark, and $$AM2(d,m)=P(d|m)$$

$$LM2(m,c)=P(m|c)$$

When m="no punctuation",

LM2("no punctuation",c)=P("no punctuation"|c)

$$=\Sigma \text{count}(c,w)$$

w≠punctuation i.e. the sum of all P(w|c) of words w which are not punctuation marks.

In step S38, $M^{ML}$ is taken as the automatically generated pseudo punctuation mark, and the current context c is updated. Therefore, the following third sequence will be formed:

"This (no punctuation) apple (no punctuation) is (no punctuation) red (comma) not (no punctuation) green (period)".

In step S39, it is judged whether the continuous speech recognition is ended. If not, then jump to step S2. Otherwise, the procedure proceeds to step S310.

In step S310, the recognized words and automatically generated punctuation marks are output. In this step, the pseudo punctuation marks can be replaced by real punctuation marks. For example, the following result will be output:

"This apple is red, not green.".

In step S311, the procedure is ended.

It should be noted that the above first, second and third sequences are progressively formed by repeatedly carrying out steps S32 to S38 along with user's reading every word. That is, the above procedure is performed in real time. The punctuation marks can be automatically generated in real time, instead of only after the completion of decoding the whole sentence. Once the decoding of the words constituting a context is completed, the punctuation marks can be generated based on the context. Of course, the speech recognition can be performed on a sentence basis. But that does not make any limitation to this invention.

As described above, the second acoustic model AM2 is constructed based on a large amount of language materials. For instance, it can be constructed by the following method.

(1)Take a training text, such as "w1w2, w3. w4" for example, Identifying the pseudo punctuation marks in the training text, so as to obtain:

w1 "no punctuation" w2 comma w3 period w4

(2)The trainer reads the text "w1w2, w3. w4" without reading punctuation marks;

(3)Using the first acoustic model AM1 and the first language model LM1 to decode the speech train of the trainer. Since there are punctuation marks in the above text, the trainer expresses a certain reading style when reading. There is no punctuation mark between w1 and w2, and they may be continuously read out. After reading w2 out, the trainer encounters a comma and may stop for a short while and inhale. Then he/she reads w3, and keeps silence (due to the period). Finally, w4 is read out. For instance, the decoded output may be:

w1w2 inhaling w3 silence w4

(4)Marking the noises in the decoded output. For the above example, it is obtained:

w1 "no sound" w2 inhaling w3 silence w4

(5)Matching pseudo punctuation marks m with corresponding pseudo noises d:

("no punctuation", "no sound")

(comma, inhaling)

(period, silence)

For a type of pseudo punctuation marks m and a type of pseudo noises, there is a corresponding relation referred to as pair (m, d). The number of pairs (m, d) will be expressed as c(m, d). The training text, i.e., the language materials as well as trainers should be enough to cover various pseudo punctuation marks and the speaking styles of ordinary people. Therefore, c(m, d) is more than 1 in general.

(6)P(d|m) is roughly estimated at c(m,d)/c(m), wherein c(m) is the sum of corresponding c(m,d') for all pseudo noises d'.

The above is a method for constructing the second acoustic model AM2. Of course, other methods can be used to construct acoustic model AM2 with the same function.

In the apparatus and method for automatically generating punctuation marks described above with reference to FIGS.

2 and 3, it is neither necessary for a user to speak out punctuation marks and nor necessary for a user to indicate the locations of punctuation marks. However, because different users may have different speaking styles, there must be certain errors when pseudo noises serve as one of the conditions for deciding the locations of punctuation marks.

In the second embodiment described hereafter, it is required that the user give out clear indication at the same time of dictating when a punctuation mark is needed during the dictation. Such a clear indication will be, for example, implemented by clicking mouse button or specific hardware. Therefore, without using pseudo noises, the second acoustic model AM2 and the pseudo noise section of the first acoustic model AM1 will be omitted. The implementation can be easier while higher accuracy will be obtained. However, it is not so convenient for users to operate as in the first embodiment.

Figure 4:
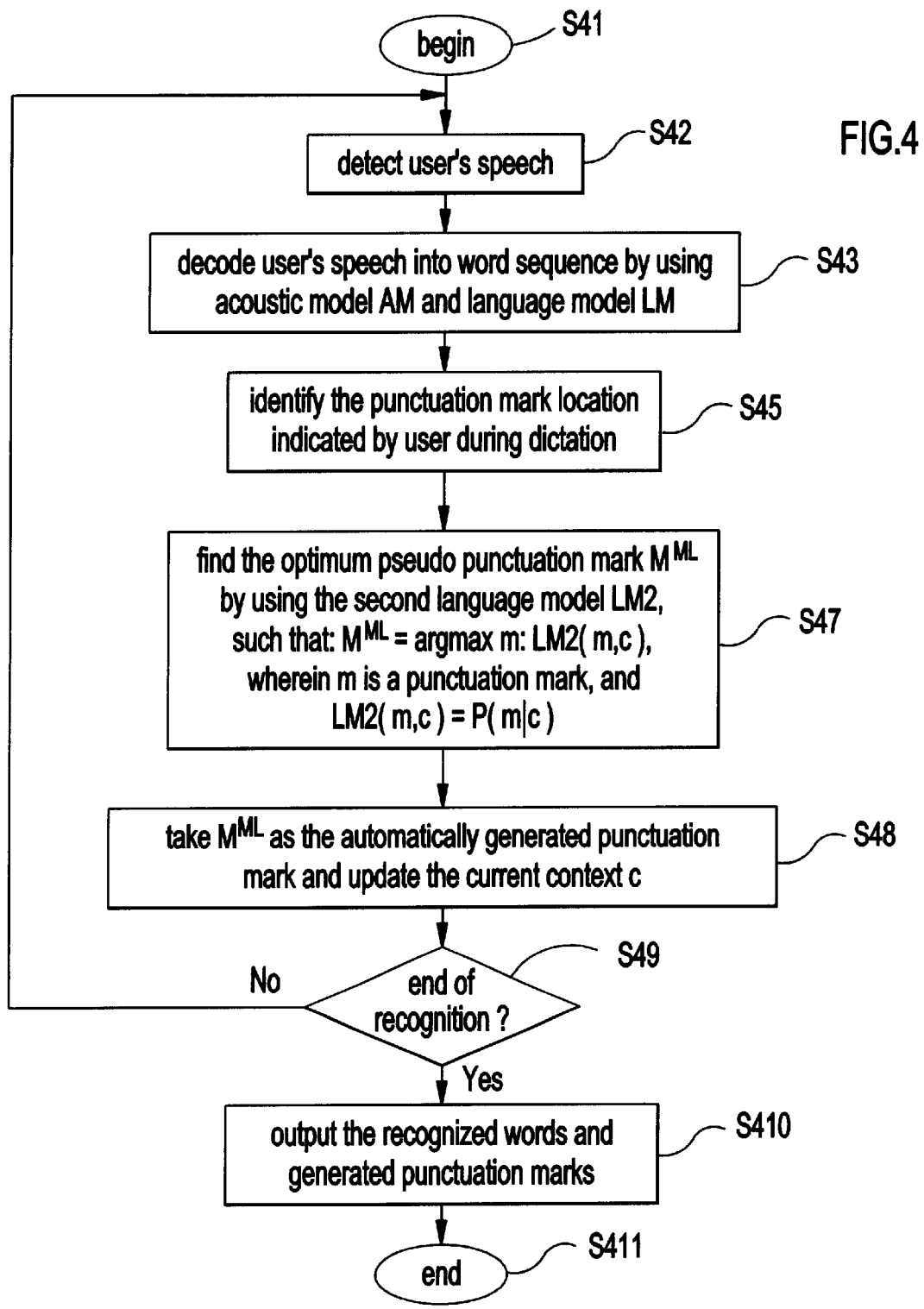
FIG. 4 is a general flowchart of the second embodiment of the method for automatically generating punctuation mark in continuous speech recognition according to this invention.

As shown in FIG. 4, the second embodiment of the method for automatically generating punctuation marks according to this invention comprises the following steps:

In step S41, the speech recognition procedure is started. In this step, all internal variables such as context c are emptied.

In step S42, the user's speech is detected. In step S43, the user's speech is decoded into words by using an ordinary acoustic model AM and language model LM.

In step S45, the punctuation mark location indicated by the user during dictation is identified.

In step S47, the optimum pseudo punctuation mark $M^{ML}$ is found by using the second language model LM2 such that:

$$M^{ML} = \text{argmax } m:LM2(m,c)$$

wherein m is a punctuation mark, and $$LM2(m,c) = P(m|c).$$

In step S48, $M^{ML}$ is taken to be the automatically generated punctuation mark, and the current context c is updated.

In step S49, it is judged whether the continuous speech recognition is ended. If not, the procedure jumps to S42. Otherwise it proceeds to step S410.

In step S410, the recognized words and automatically generated punctuation marks are output. In this step, the pseudo punctuation marks can be replaced by real punctuation marks.

In step S411, the procedure ends.

Now the third embodiment will be described. It is an intermediate form of the first embodiment and the second embodiment in functions. The third embodiment differs from the second embodiment in that, although it requires user to give a definite indication when any punctuation mark is needed during dictation, it only requires the user to utter a special sound, e.g. "lip smacking" to generate any detectable noise, or to intentionally keep silence to indicate a punctuation mark, without making any physical movement. In this way, it is more advantageous for users to fluently speak. The third embodiment differs from the first embodiment in that a special sound is generated at the location of a punctuation mark during dictation, so the difference between natural noises and the sound for indicating a punctuation mark will be more obvious. When the second acoustic model AM2 is constructed, there are the same requirements for the trainer. It is proved by the practice that the third embodiment has higher accuracy than the first one.

The method of the invention is not necessarily limited to post processing, i.e. it is not necessary to automatically generate the punctuation mark after the completion of decoding the whole sentence, but in real time. That is, punctuation marks can be automatically generated according to the context as soon as words forming the context are decoded.

While the preferred embodiments of the invention have been described as above, it should be understood that those skilled in the art can make various modifications and changes to the embodiments without departing from the spirit and the scope of the invention. Therefore, the protection scope of the invention will be limited by the claims.

What is claimed is:

1. An apparatus for automatically generating punctuation marks in a continuous speech recognition system, comprising means for recognizing user speech and converting said user speech into words, said means for recognizing user speech further recognizing pseudo noises in said user speech; and said apparatus further comprising:
   means for marking pseudo noises in output results of said means for recognizing user speech; and
   means for generating punctuation marks by finding most likely pseudo punctuation marks at locations of pseudo noises marked by means for marking pseudo noises based on a language model containing pseudo punctuation marks, said means for generating punctuation marks comprising:
      means for calculating probability for each pseudo punctuation mark in a language model containing pseudo punctuation marks that said pseudo punctuation mark would occur in said output results of said means for recognizing user speech;
      means for calculating probabilities that particular pseudo noises will occur at locations of particular pseudo punctuation marks; and
      means for finding most likely pseudo punctuation marks at locations of said pseudo noises marked by said means for marking pseudo noises based on said probabilities calculated, and generating punctuation marks corresponding to said most likely pseudo punctuation marks.

2. An apparatus for automatically generating punctuation marks in a continuous speech recognition system, comprising means for recognizing user speech and converting said user speech into words, further comprising:

means for generating location indicating signals in response to operations of a user during dictation, said location indicating signals indicating locations in output results of said means for recognizing user speech;
   means for calculating probability for each pseudo punctuation mark in a language model containing pseudo punctuation marks that said pseudo punctuation mark would occur in said output results of said means for recognizing; and
   means for finding most likely pseudo punctuation marks at locations indicated by said location indicating signal based on said probabilities calculated, and generating punctuation marks corresponding to said most likely pseudo punctuation marks.

3. A method for automatically generating punctuation marks in a continuous speech recognition system, comprising a step of recognizing user speech and converting said user speech into words, pseudo noises in said user speech are also recognized in said step of recognizing user speech; and
   said method further comprising steps of:
      marking pseudo noises in output results of said step of recognizing user speech; and generating punctuation marks by finding most likely pseudo punctuation marks at locations of said pseudo noises marked in said step of marking pseudo noises, based on a language model containing pseudo punctuation marks, said step of generating punctuation marks comprising the steps of:

calculating probability for each pseudo punctuation mark in a language model containing pseudo punctuation marks that said pseudo punctuation mark would occur in said output results of said step of recognizing user speech;

calculating probabilities that particular pseudo noises will occur at locations of particular pseudo punctuation marks; and finding most likely pseudo punctuation marks at locations of said pseudo noises marked in said step of marking pseudo noises, based on said probabilities calculated, and generating punctuation marks corresponding to said most likely pseudo punctuation marks.

4. An method for automatically generating punctuation marks in a continuous speech recognition system, comprising a step of recognizing user speech and converting said user speech into words, further comprising steps of:

generating a location indicating signal in response to operations of a user during dictation, said location indicating signal indicating locations in output results of said step of recognizing user speech;

calculating probability for each pseudo punctuation mark in a language model containing pseudo punctuation marks that said pseudo punctuation mark would occur in said output results of said step of recognizing user speech; and finding most likely pseudo punctuation marks at locations indicated by said location indicating signal based on said probabilities calculated, and generating punctuation marks corresponding to said most likely pseudo punctuation marks.

* * * * *